April 9, 1929.  J. C. W. SMITH  1,708,035
AUTOMOBILE SHADE
Filed Sept. 15, 1926
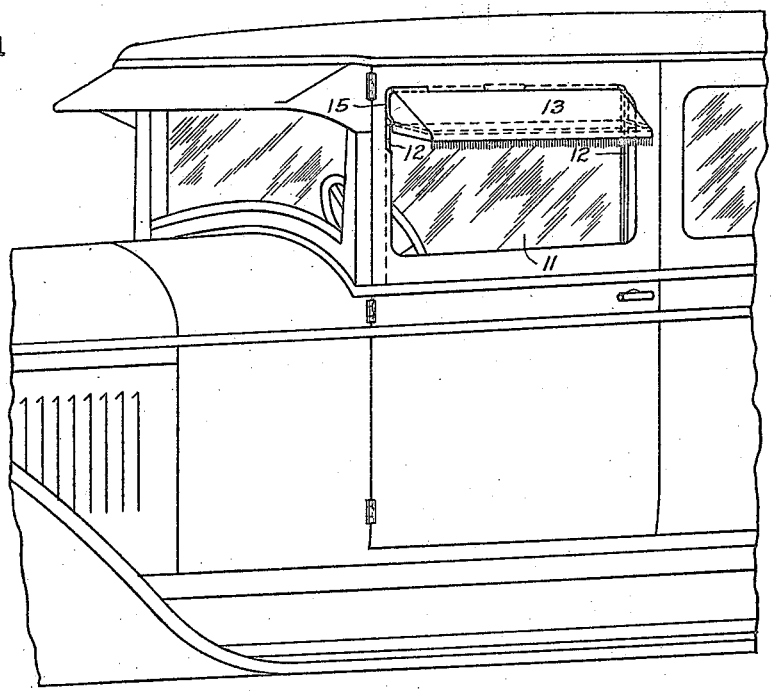
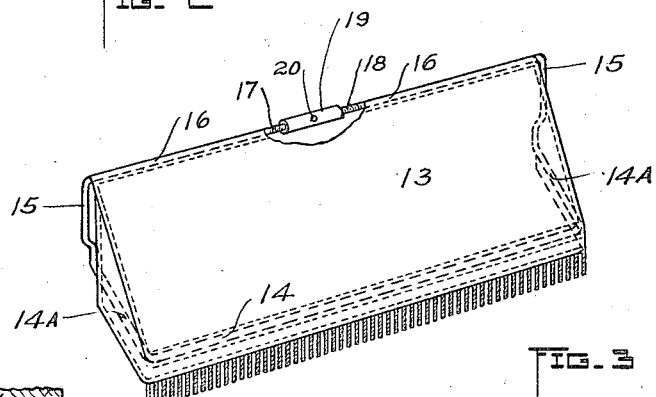
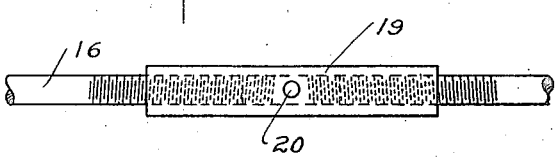
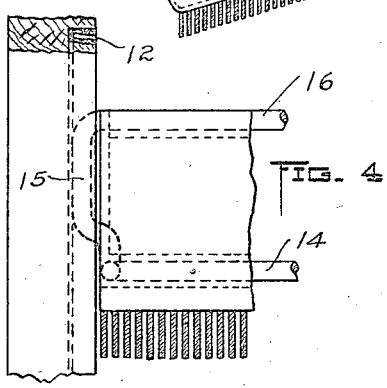
INVENTOR
John C. W. Smith
By Tefft and Tefft
ATTORNEYS Patented Apr. 9, 1929.

1,708,035

UNITED STATES PATENT OFFICE.

JOHN C. W. SMITH, OF BLOOMINGTON, ILLINOIS, ASSIGNOR TO RALPH P. MILLER, OF BLOOMINGTON, ILLINOIS.

AUTOMOBILE SHADE.

Application filed September 15, 1926. Serial No. 135,498.

My invention relates to detachable shades for motor cars and the like.

The object of my invention is in the provision of a quick detachable and readily removable shade for the windows of automobiles and vehicles and the like generally.

Another object of my invention is in the provision of a metal framing portion adapted to have readily attached thereto a shade portion, said framing being fashioned for ready attachment and removal from the window portion of a motor vehicle without defacement of the motor vehicle.

Still another object of my invention is in the fashioning of a metal rod in such manner as to permit same to be placed within the window portion of a motor vehicle, said rod having a means for connecting the opposed end portions to permit contraction and extension and a shade portion adapted to be readily attached to said rod portion.

A further object of my invention is in the fashioning of a rod member in such manner that a detachable framing member is provided for the windows of motor vehicles, said framing member having an outwardly projecting rod supporting portion upon which is sewn a shade member.

A still further object of my invention is in the provision of a framing support for a shade member, said framing presenting projecting attachment members adapted to lie within that portion of an automobile window normally receiving the glass window pane, said framing support and shade member being adapted to shade the occupants of the vehicle sitting adjacent the shade portion.

Other objects of my invention will appear in the following specification taken in connection with the annexed drawings in which Fig. 1 is a perspective view of a closed automobile, the window adjacent the driver's seat having attached thereto my special window shade.

Fig. 2 is a perspective view showing in detail the peculiar fashioning of the shade supporting member and means for attaching and removing same from an automobile window.

Fig. 3 is a detail view of the expansion means, and

Fig. 4 is a detail showing the means of attachment.

Referring to the drawings, in Fig. 1 we find disclosed an automobile of conventional type, same being of the closed design. As stated in the objects of the invention, applicant has devised a readily attachable shade member for the windows of automobiles and in Fig. 1 of the drawings we find shown a detachable shade member in the window of the car.

Obviously, this shade member is to prevent the rays of the sun from being projected directly upon the occupants of the motor car, and obviously, the shade member may be attached not only to one but all of the window portions of the car.

It is thought unnecessary to describe in detail the window portions of motor vehicles other than to say that the glass portion 11 has in every instance some manually operated means for raising and lowering same. The pane of glass 11 is raised and lowered in channels 12, on either side, said channels usually having felt or padded glass receiving portions to prevent rattling or breakage of the glass. Applicant's shade member, or rather the support therefor, is adapted to be inserted in the channels 12, as well as within a second upper channelled portion lying above and receiving the glass pane 11. It is apparent that the glass portion must be lowered to permit insertion and removal of the shade portion, and this is clearly shown in Fig. 1 of the drawings. The framing upon which the shade 13 is sewn is disclosed in detail in Fig. 2, wherein it may be clearly seen that this frame or shade supporting member is merely a single steel rod 14 shaped by bending to prevent an outwardly projecting portion 14ª. Attachment ears 15, which extend outwardly beyond the portion 14ª are adapted to engage the channels 12 of the motor car window. That portion of the shade frame designated 16 connects the side portions, said portion 16 being the end portions of the original steel rod referred to as 14. The opposed ends 17 and 18 of said before-mentioned steel rod 14, are screw threaded as may be clearly seen in Fig. 2, and are adapted to receive the turnbuckle 19 which upon manual rotation in one direction or the other, acts to increase or decrease the length of the portion 16. Obviously, this turn buckle provides the means for fixedly attaching the frame within the channels 12 of the motor car window and it is apparent that upon attachment within the window channel the rod 16 will lie also in the channel that normally overlies the glass pane 11 and in such manner that when the shade is sewn thereon said shade will form a perfect means for shedding the water from the top of the car without permitting rain to be forced into the automobile through the connecting point of the shade and window.

An aperture 20 is formed in the turn buckle 19 to permit the insertion of a small instrument such as a nail or the like, to permit manual rotation of the turn buckle in case said turn buckle should have become so tightly threaded upon the opposed ends 17 and 18 as to prevent ordinary manual movement thereof.

The shade 13 which may be made of canvas or any kind of water-proofed or water shedding material, is sewn upon the shade-supporting member, as may be clearly seen in the drawings. It would be possible, of course, to attach this shade member in some other manner than by sewing same upon the frame portion.

With respect to applicant's quick detachable shade member, the same is thought to have been described in a manner to permit a clear understanding of the manner of attaching same to an automobile window and the manner of removing same, if such removal is thought necessary.

Applicant realizes that shades have been heretofore provided for motor vehicles, same usually being of the type wherein the shade framing member is bolted to the window frame in a manner to deface the motor vehicle and for this reason being obviously undesirable although providing a shade member similar to applicant's as far as the retarding of the sun's rays is concerned. Applicant is aware also of rod members which are inserted within the window in a manner to receive a shade thereon. However said rod members do not consist of a single steel rod bent in such manner as applicant's to provide a sturdy shade frame, means for fixedly attaching same in the channel portions and the ready means for attaching and removing the shade and frame from the window.

Applicant's quick detachable shade member may obviously be built in varied sizes to fit any make of automobile, and the ease of attachment to the automobile is just as apparent as the fact that this attachment is not accompanied by the least defacement of the car.

What I claim is:

1. An awning frame for channelled automobile windows comprising an integral one piece rod member bent in a manner to present an outwardly projecting shade receiving edge, an inner shade receiving edge adapted to lie within the upper window channel, a shade member capable of attachment upon said rod member, attachment ears formed integrally with said rod, the lower extremities of said ears being bent inwardly in the plane of the window and transversely outwardly therefrom, and adapted to engage the side window channels and means for expanding and contracting the inner shade receiving edge.

2. A detachable awning frame for channelled automobile windows comprising a bent wire frame therefor, means for holding the frame in the upper part of the window channels, said frame including a substantially U-shaped member the lower extremities of said member being bent inwardly in the plane of the window and transversely outwardly therefrom and adapted to lie within the window channels, and a substantially U-shaped member projecting outwardly from the window, said last mentioned U-shaped member being connected to and supported by the lower portion of the U-shaped member in the window channels, so as to complete the awning frame, and an awning fabric attached to the frame member in the top window channel and to the edge portions of the frame projecting outwardly from the window.

3. A detachable awning frame for channelled automobile windows comprising an integral one-piece wire frame therefor, means for holding the frame in the upper part of the window channels, said frame including a substantially U-shaped member adapted to lie within the window channels, the lower extremities of said U-shaped member being bent inwardly in the plane of the window and transversely outwardly therefrom to form awning-receiving members and an outer member connecting the projecting members to form an awning-receiving edge and an awning fabric attached to the top transverse side, and outer portions of the frame.

4. An awning frame for channelled automobile windows comprising a resilient integral frame therefor, means for expanding the frame to hold it in the upper part of the window channels, said frame including a substantially U-shaped member the lower extremities of said member being bent inwardly in the plane of the window and transversely outwardly therefrom and adapted to lie within the window channels, and a substantially U-shaped member projecting outwardly from the window, the legs of the two U-shaped members being connected so as to complete the awning frame, and an awning fabric attached to the frame member in the top window channel and to the edge portions of the frame projecting outwardly from the window.

5. A detachable awning frame for channelled automobile windows comprising a resilient wire frame therefor, means for expanding the frame to hold it in the upper part of the window channels, said frame including a substantially U-shaped member adapted to lie within the window channels, and a U-shaped member projecting outwardly from the window, said projecting U-shaped member being connected to and supported by the U-shaped member in the window channel and an awning fabric attached to that portion of the frame within the top channel of the window and to the edge portions of the U-shaped member projecting from the window.

6. A detachable awning frame for channelled automobile windows comprising a bent wire frame therefor, means for holding the frame in the upper part of the window channels, said frame including a substantially U-shaped member the lower extremities of said member being bent inwardly in the plane of the window and transversely outwardly therefrom and adapted to lie within the window channels, and a substantially U-shaped member projecting outwardly from the window, said last mentioned U-shaped member being connected to and supported by the lower portion of the U-shaped member in the window channels, so as to complete the awning frame.

7. A detachable awning frame for channelled automobile windows comprising an integral one-piece wire frame therefor, means for holding the frame in the upper part of the window channels, said frame including a substantially U-shaped member adapted to lie within the window channels, the lower extremities of said U-shaped member being bent inwardly in the plane of the window and transversely outwardly therefrom to form awning receiving members, and an outer members connecting the projecting members to form an awning-receiving edge.

8. An awning frame for channelled automobile window comprising a resilient integral frame therefor, means for expanding the frame to hold it in the upper part of the window channels, said frame including a substantially U-shaped member the lower extremities of said member being bent inwardly in the plane of the window and transversely outwardly therefrom and adapted to lie within the window channels, and a substantially U-shaped member projecting outwardly from the window, the legs of the two U-shaped members being connected so as to complete the awning frame.

9. A detachable awning frame for channelled automobile windows comprising a resilient wire frame therefor, means for expanding the frame to hold it in the upper part of the window channels, said frame including a substantially U-shaped member adapted to lie within the window channels, and a U-shaped member projecting outwardly from the window, said projecting U-shaped member being connected to and supported by the U-shaped member in the window channel.

In testimony whereof, I have hereunto affixed my signature.

JOHN C. W. SMITH.